United States Patent
Kaminogo

(10) Patent No.: US 9,215,342 B2
(45) Date of Patent: Dec. 15, 2015

(54) ELECTRONIC DEVICE CAPABLE OF APPARATUS SETTING ACCORDING TO SELF-LOCATION, STORAGE MEDIUM, AND APPARATUS SETTING METHOD

(71) Applicant: KYOCERA Document Solutions Inc., Osaka (JP)

(72) Inventor: Akira Kaminogo, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/471,064

(22) Filed: Aug. 28, 2014

(65) Prior Publication Data
US 2015/0077792 A1    Mar. 19, 2015

(30) Foreign Application Priority Data
Sep. 13, 2013  (JP) .................................. 2013-190115

(51) Int. Cl.
*G06F 3/12* (2006.01)
*H04N 1/00* (2006.01)

(52) U.S. Cl.
CPC .......... *H04N 1/00954* (2013.01); *G06F 3/1296* (2013.01)

(58) Field of Classification Search
None
See application file for complete search history.

(56) References Cited

U.S. PATENT DOCUMENTS

| | | | |
|---|---|---|---|
| 2005/0068571 A1* | 3/2005 | Hart | H04N 1/00283 358/1.15 |
| 2012/0120259 A1* | 5/2012 | Sakiyama | G06F 3/1204 348/207.2 |
| 2013/0015962 A1* | 1/2013 | Dailey | B60R 25/33 340/426.11 |
| 2013/0114100 A1* | 5/2013 | Torii | G06F 11/0733 358/1.14 |

FOREIGN PATENT DOCUMENTS

| | | |
|---|---|---|
| JP | 2004-050585 A | 2/2004 |
| JP | 2004-358787 A | 12/2004 |

\* cited by examiner

*Primary Examiner* — Marcus T Riley
(74) *Attorney, Agent, or Firm* — Studebaker & Brackett PC

(57) ABSTRACT

An electronic device includes a resource information storage section, a location detecting section, a resource information retrieval section, and an activation section. The resource information storage section stores local resource information items in an inactive state to be used for apparatus setting in individual regions. The location detecting section detects a self-location of the electronic device. The resource information retrieval section retrieves a local resource information item corresponding to a region of the individual regions that includes the detected self-location from the resource information storage section. The activation section reads out the retrieved local resource information item from the resource information storage section and activates the read local resource information item to an active state.

19 Claims, 5 Drawing Sheets

ELECTRONIC DEVICE CAPABLE OF APPARATUS SETTING ACCORDING TO SELF-LOCATION, STORAGE MEDIUM, AND APPARATUS SETTING METHOD

INCORPORATION BY REFERENCE

The present application claims priority under 35 U.S.C. §119 to Japanese Patent Application No. 2013-190115, filed Sep. 13, 2013. The contents of this application are incorporated herein by reference in their entirety.

BACKGROUND

The present disclosure relates to electronic devices capable of apparatus setting corresponding to a region where it is installed, storage media, and apparatus setting methods.

Among image forming apparatuses such as digital multifunction peripherals and printers, a certain image forming apparatus identifies its self-location using a satellite positioning system such as global positioning system (GPS), and performs apparatus setting on a regional basis according to a local resource information item corresponding to the self-location.

For example, a certain printer includes therein a GPS to identify its self-location at a power-up using the GPS. The printer then downloads a font (local resource information item) necessary in the region that includes the self-location from a font server.

This can enable appropriate setting of the printer corresponding to the region where the pointer is located. However, the necessity of an external server such as the font server may incur an increase in cost.

In view of the foregoing, another printer stores therein fonts in several languages in a switchable manner to eliminate an external server.

However, a license fee may be required for use of some font. Accordingly, for storage of every font in a switchable manner in the printer, an expense for the font requiring the license fee may be incurred regardless of the use or non-use of the font. This may limit cost reduction.

SUMMARY

According to the first aspect of the present disclosure, an electronic device includes a resource information storage section, a location detecting section, a resource information retrieval section, and an activation section. The resource information storage section stores local resource information items in an inactive state to be used for apparatus setting in individual regions. The location detecting section detects a self-location of the electronic device. The resource information retrieval section retrieves a local resource information item corresponding to a region of the individual regions that includes the detected self-location from the resource information storage section. The activation section reads out the retrieved local resource information item from the resource information storage section and activate the read local resource information item to an active state.

According to the second aspect of the present disclosure, a non-transitory computer-readable storage medium has stored thereon a program that causes execution of a computer included in an electronic device. The program causes the computer to: cause a resource information storage section to store local resource information items in an inactive state to be used for apparatus setting in individual regions; detect a self-location of the electronic device; retrieve a local resource information item corresponding to a region of the individual regions that includes the detected self-location from the resource information storage section; and read out the retrieved local resource information item from the resource information storage section and activate the read local resource information item to an active state.

According to the third aspect of the present disclosure, an apparatus setting method includes: causing a resource information storage section to store local resource information items in an inactive state to be used for apparatus setting in individual regions; detecting, via a location detecting section, a self-location of an electronic device; retrieving, via a resource information retrieval section, a local resource information item corresponding to a region of the individual regions that includes the detected self-location from the resource information storage section; and reading, via an activation section, out the retrieved local resource information item from the resource information storage section and activating the read local resource information item to an active state.

DETAILED DESCRIPTION

An electronic device according to embodiments of the present disclosure causes a resource information storage section to store local resource information items in an inactive state to be used for apparatus setting in individual regions according to its self-location (i.e., location of the electronic device). Upon detection of the self-location, the electronic device retrieves and reads out from the resource information storage section a local resource information item corresponding to a region of the individual regions that includes the self-location to activate the read local resource information item to an active state. Thus, the electronic device according to the present embodiments can achieve region-based apparatus setting corresponding to the self-location in a cost effective manner.

With reference to the accompanying drawings, an image forming apparatus will be described as an example of the electronic device in the following embodiments.

First Embodiment

Configuration of Image Forming Apparatus

Figure 1:
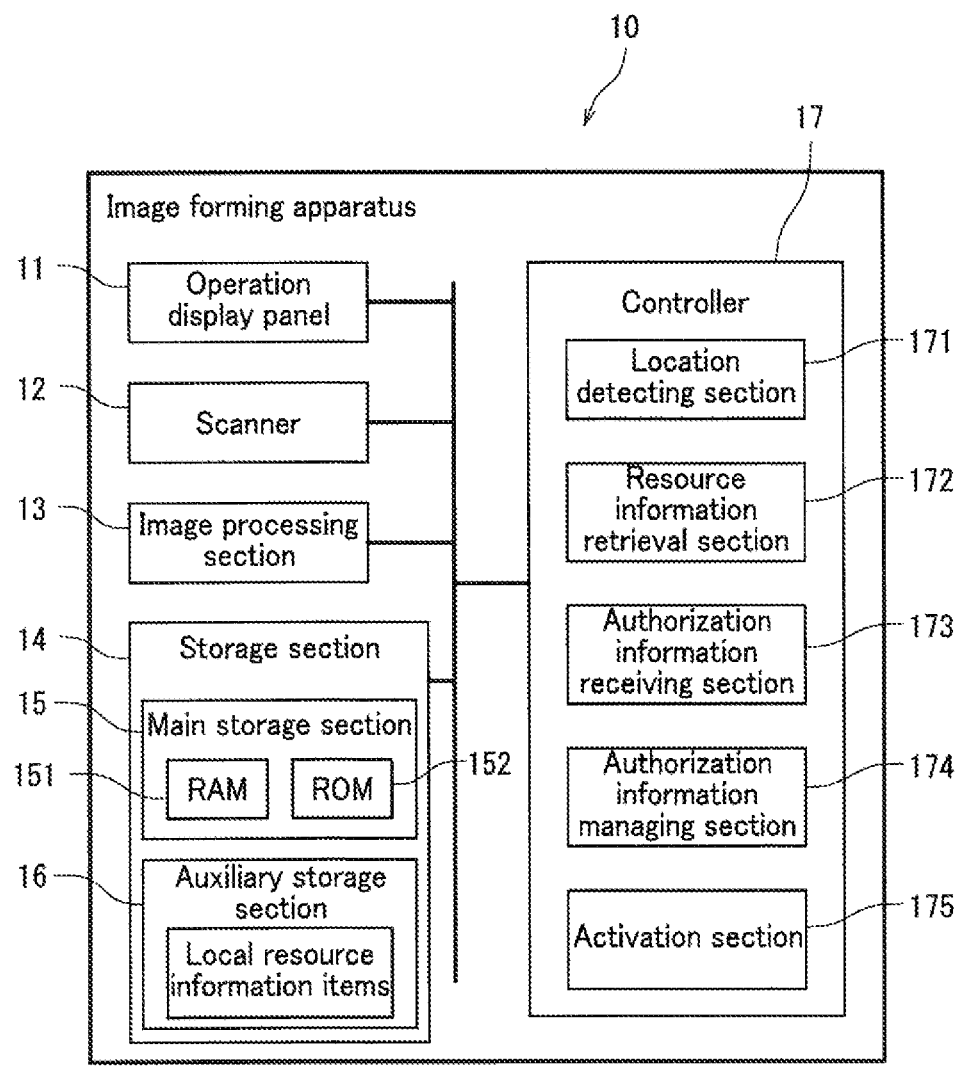
FIG. 1 shows a configuration of an image forming apparatus according to the first embodiment of the present disclosure.

FIG. 1 shows a configuration of an image forming apparatus 10 according to the first embodiment of the present disclosure.

The image forming apparatus 10 in the first embodiment is a digital multifunction peripheral, for example, and provides various functions including a print function, a copy function, and a fax function. Since to-be-used specification including language, font, and/or paper size differs according to a region where the image forming apparatus 10 is installed, apparatus setting must be done according to the specification corresponding to the region in order to execute each of the various functions.

The image forming apparatus 10 stores in advance local resource information items (e.g., font information items) for apparatus setting in the individual regions, and automatically performs apparatus setting corresponding to the region of the individual regions that includes the self-location. In the first embodiment, the self-location is the location of the image forming apparatus 10. The apparatus setting is performed at a power-up of the image forming apparatus 10, for example.

The image forming apparatus 10 includes an operation display panel 11, a scanner 12, an image processing section 13, a storage section 14, and a controller 17 (computer). FIG. 1 mainly shows elements for apparatus setting in the individual regions, and omits other elements for the various functions.

The operation display panel 11 includes a liquid crystal display screen of touch panel type, for example, to receive various types of input operations to the image forming apparatus 10 and display various types of input results.

The scanner 12 scans an original image formed on paper to generate image data.

The image processing section 13 forms an image on the paper based on a print job. The print job is received through the operation display panel 11, a network, or the like.

The storage section 14 includes a main storage section 15 and an auxiliary storage section 16. The main storage section 15 includes a read only memory (ROM) 152 to store operation control programs and the like, and a random access memory (RAM) 151 serving as a work area. The auxiliary storage section 16 includes a hard disk drive (HDD), for example. The auxiliary storage section 16 functions as a resource information storage section to store local resource information items prepared on a regional basis (e.g., based on individual countries). Each of the main storage section 15 and the auxiliary storage section 16 is an example of a storage medium.

Figure 2:
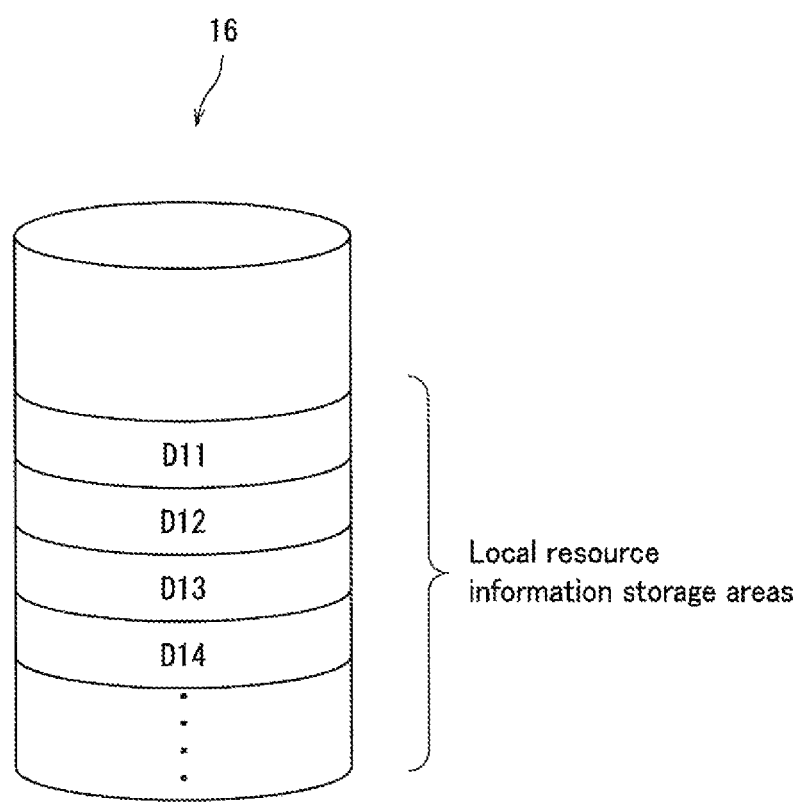
FIG. 2 shows data storage areas in a storage section of the image forming apparatus according to the first embodiment of the present disclosure.

FIG. 2 shows storage areas for the local resource information items in the auxiliary storage section 16. For example, local resource information storage areas D11, D12, D13, D14 . . . are assigned in the auxiliary storage section 16. Local resource information items unique to the respective regions are stored (installed) in the local resource information storage areas D11, D12, D13, D14 . . . . Each local resource information item includes language display data such as a font and a program, for example.

The program data included in the respective local resource information items is used for, for example, setting operation control in individual regions and includes software such as a filter and an emulator.

The local resource information items are stored in an inactive state in which direct use thereof is not allowed in the auxiliary storage section 16. Accordingly, even if language display data included in a local resource information item includes a font for use of which a license fee is required, no duty to pay the license fee for use of the font is imposed as long as the local resource information item is in the inactive state in the image forming apparatus 10. Each local resource information item in the inactive state becomes usable by changing it to an active state (activation) as will be described later.

The controller 17 is a computing unit such as a central processing unit (CPU) to performs various types of processing and control by executing programs stored in the main storage section 15.

The controller 17 serves as a location detecting section 171, a resource information retrieval section 172, an authorization information receiving section 173, an authorization information managing section 174, and an activation section 175 by executing programs stored in the main storage section 15.

The location detecting section 171 provides a location detecting function. For example, the location detecting section 171 detects the self-location using a GPS. Specifically, the location detecting section 171 detects the current location of the image forming apparatus 10 using the GPS. More specifically, the image forming apparatus 10 includes a GPS receiver. The location detecting section 171 detects the location of the image forming apparatus 10 based on information that the GPS receiver receives from a GPS satellite, such as the latitude and the longitude of the image forming apparatus 10.

The self-location detection herein is not limited to detection using the GPS. The location detecting section 171 can detect the self-location using an indoor positioning system that detects a location indoors. For example, the location detecting section 171 may detect the self-location using an indoor positioning system such as an indoor messaging system (IMES) that detects a location indoors in a building or an underground space. The self-location is detected upon a power-up of the image forming apparatus 10, for example.

The resource information retrieval section 172 provides a resource information retrieval function to retrieve from the auxiliary storage section 16 a local resource information item corresponding to the region that includes the location of the image forming apparatus 10 (the self-location) detected by the location detecting section 171, that is, the region identified according to the detected location of the image forming apparatus 10.

The authorization information receiving section 173 provides an authorization information receiving function to receive input of authorization information to be used for authorization in activating a local resource information item. Some of the stored local resource information items may require authorization in activation, such as a font for use of which a license fee is required, for example. In view of this, the authorization information receiving section 173 receives in advance input of authorization information for the local resource information item for use of which authorization is required.

For example, the authorization information receiving section 173 causes the operation display panel 11 to display an authorization receiving screen, and receives input of authorization information such as a license key issued by a manufacturer for the local resource information item for use of which authorization is required.

The authorization information managing section 174 provides an authorization managing function to store in the storage section 14 and manage the authorization information that the authorization information receiving section 173 receives.

The activation section 175 provides an activating function to change the state of the local resource information item retrieved by the resource information retrieval section 172 from the inactive state to the active state by reading out it from the auxiliary storage section 16 and loading it into the RAM 151 of the main storage section 15.

When authorization is required for use of a local resource information item, the activation section 175 activates the local resource information item using the authorization information managed by the authorization information managing section 174. Specifically, the activation section 175 sends to an authorization server an authorization request for use of the local resource information item based on the authorization information that the authorization information managing section 174 manages. When the authorization is granted, the activation section 175 activates the local resource information item. Any existing authorization system can act as the authorization server.

The activated local resource information item enables apparatus setting of the image forming apparatus 10 according to the local resource information item. For example, the font displayed on the operation display panel 11 and the operation of the image forming apparatus 10 are set correspondingly to the region where the image forming apparatus 10 is located according to the local resource information item.

Activation

Figure 3:
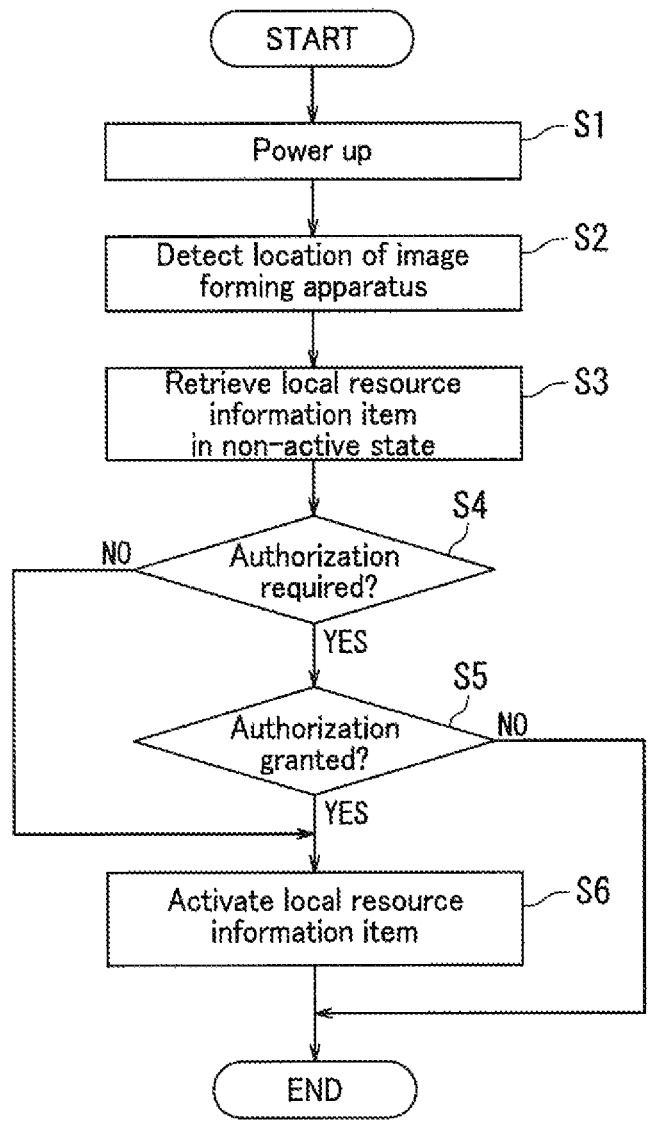
FIG. 3 shows steps for activation that the image forming apparatus performs according to the first embodiment of the present disclosure.

FIG. 3 shows steps for activation by the image forming apparatus 10. The activation starts upon a power-up of the image forming apparatus 10. The controller 17 executes a program stored in the main storage section 15 for the activation in Steps S1-S6. The controller 17 executes in advance a program store in the main storage section 15 to cause the auxiliary storage section 16 to store the local resource information items in the inactive state to be used for apparatus setting in individual regions.

Specifically, the image forming apparatus 10 is powered up at Step S1 (power-up). In Step S1, for example, a user turns on the power through the operation display panel 11 to cause the controller 17 to start supplying power to respective sections from the power source unit not shown.

After "power-up" at Step S1, the routine proceeds to Step S2.

At Step S2, the location of the image forming apparatus 10 is detected (detect location of image forming apparatus). In Step S2, the location detecting section 171 detects the self-location. In other words, the location detecting section 171 detects the location of the image forming apparatus 10 based on information such as the latitude and the longitude of the image forming apparatus 10 (apparatus body) measured by a positioning system such as a GPS. After Step S2, the routine proceeds to Step S3.

At Step S3, a local resource information item in the inactive state is retrieved (retrieve local resource information item in inactive state). In Step S3, the resource information retrieval section 172 retrieves the local resource information item corresponding to the region that includes the detected self-location from the auxiliary storage section 16. Specifically, the resource information retrieval section 172 first identifies the region that includes the location where the image forming apparatus 10 is installed (hereinafter it may be referred to as "installation region") based on the location of the image forming apparatus 10 detected by the location detecting section 171.

Then, the resource information retrieval section 172 retrieves the local resource information item corresponding to the identified installation region from the auxiliary storage section 16. The identification of the installation region can be done by using a table for region identification in which locations are associated with regions.

When the local resource information item corresponding to the installation region of the image forming apparatus 10 is retrieved at Step S3, the routine proceeds to Step S4.

At Step S4, whether or not authorization is required is determined (authorization required?). In Step S4, the authorization information receiving section 173 determines whether or not authorization is required for use of the local resource information item retrieved at Step S3.

When it is determined that authorization is required for the use of the local resource information item (YES at Step S4), the routine proceeds to Step S5. When it is determined that it is not required (NO at Step S4), the routine proceeds to Step S6.

At Step S5, whether or not the authorization is granted is determined (authorization granted?). In Step S5, the activation section 175 sends to an authorization server an authorization request for use of the local resource information item based on the authorization information that the authorization information managing section 174 manages.

When the authorization for use of the local resource information item is granted (YES at Step S5), the routine proceeds to Step S6. When it is not granted (NO at Step S5), the activation is ended.

At Step S6, the local resource information item is activated (activate local resource information item). In Step S6, the activation section 175 reads out the retrieved local resource information item from the auxiliary storage section 16 and activates the read local resource information item to the active state. Specifically, the activation section 175 first reads out the local resource information item retrieved at Step S3 from the auxiliary storage section 16. Then, the activation section 175 loads the read local resource information item into the RAM 151 of the main storage section 15 to change the state of the local resource information item from the inactive state to the active state (activation).

With the local resource information item activated at Step S6, the apparatus setting corresponding to the region where the image forming apparatus 10 is installed can be performed on the image forming apparatus 10. It is noted that Steps S1-S6 constitute a part of the apparatus setting method.

Advantages of First Embodiment

The apparatus setting according to the self-location can be performed on the image forming apparatus 10. The image forming apparatus 10 includes: the auxiliary storage section 16 that stores the local resource information items in the inactive state to be used for apparatus setting in individual regions; the location detecting section 171 that detects the self-location; the resource information retrieval section 172 that retrieves a local resource information item corresponding to a region of the individual regions that includes the detected self-location from the auxiliary storage section 16; and the activation section 175 that reads out the retrieved local resource information item from the auxiliary storage section 16 and activate the read local resource information item to enable the apparatus setting.

According to the first embodiment, an external server can be eliminated, and a license fee is required by a local resource information item to be used. This can enable cost effective apparatus setting of the image forming apparatus 10 correspondingly to any individual region that includes the self-location.

Specifically, the apparatus setting can be performed by activation of a local resource information item stored in the auxiliary storage section 16 of the image forming apparatus 10, thereby eliminating an external server for management of the local resource information item. Thus, cost reduction can be achieved at system introduction.

In addition, a license fee for a local resource information item for use of which the license fee is required can be paid only when the local resource information item is activated in the image forming apparatus 10. Thus, the cost can be reduced further.

Second Embodiment

Figure 4:
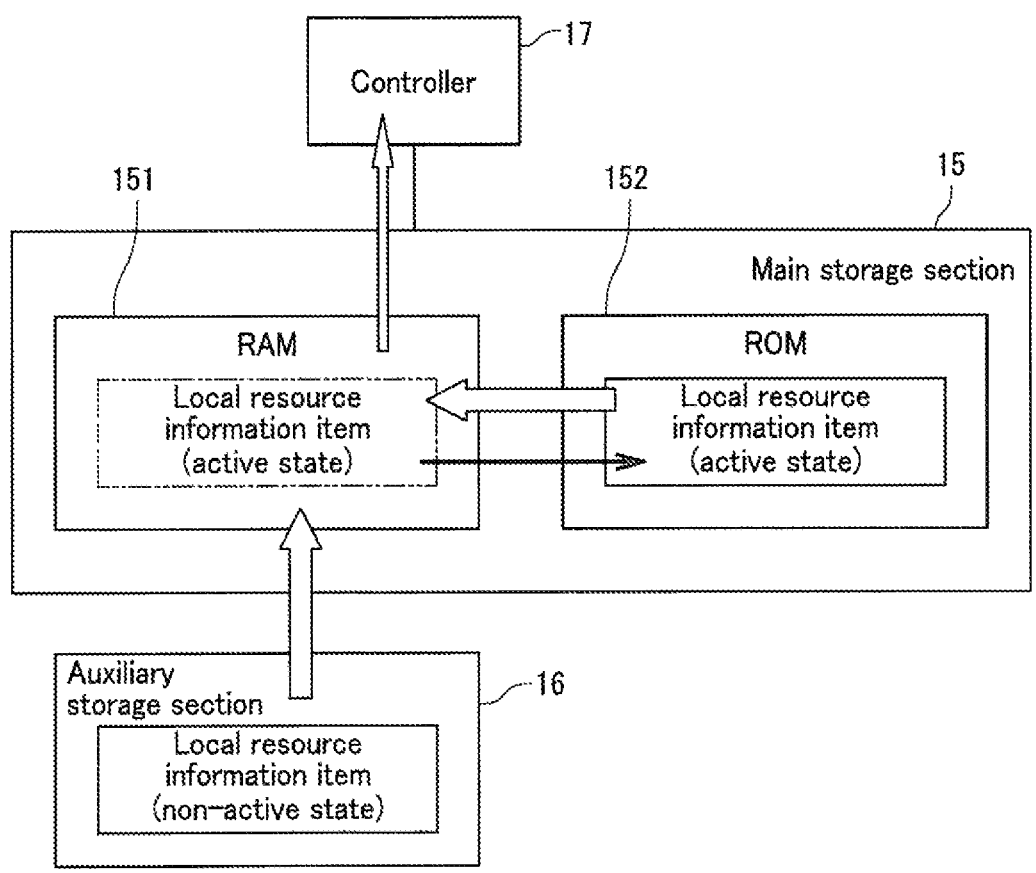
FIG. 4 shows the configuration of a storage section of an image forming apparatus according to the second embodiment of the present disclosure.

FIG. 4 shows a configuration of a storage section of an image forming apparatus according to the second embodiment of the present disclosure. The basic configuration of the image forming apparatus according to the second embodiment is common to that in the image forming apparatus 10 according to the first embodiment. Therefore, the same reference numerals as those of the image forming apparatus 10 in the first embodiment are assigned to the same elements of the image forming apparatus 10 in the second embodiment, and duplicate description of the elements may be omitted.

As shown in FIG. 4, the controller 17 in the second embodiment causes the ROM 152, which is a nonvolatile area of the main storage section 15, to store a local resource information item activated by the activation section 175. Specifically, the local resource information item is loaded into the RAM 151 of the main storage section 15 to be activated and is then stored in the ROM 152 in the similar manner to that in the first embodiment.

The local resource information item stored in the ROM 152 is used for apparatus setting at the next and subsequent power-up of the image forming apparatus 10.

At a power-up of the image forming apparatus 10, the resource information retrieval section 172 primarily retrieves the local resource information item corresponding to the region that includes the location of the image forming apparatus 10 from the ROM 152. Where the ROM 152 has already stored the local resource information item corresponding to the region that includes the location of the image forming apparatus 10, the stored local resource information item is used for apparatus setting.

Only when the ROM 152 has not stored the local resource information item corresponding to the region that includes the location of the image forming apparatus 10, the resource information retrieval section 172 secondarily retrieves the local resource information item from the auxiliary storage section 16.

Figure 5:
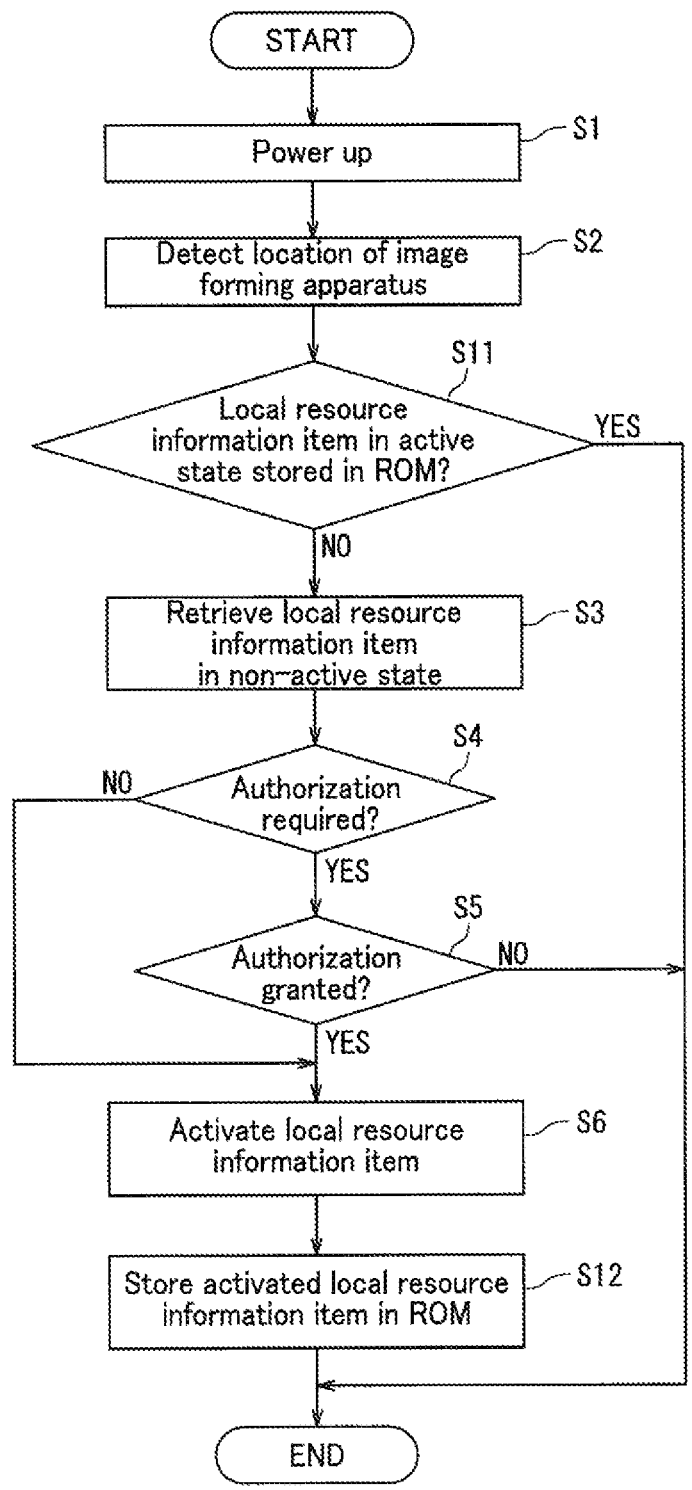
FIG. 5 shows steps for activation that the image forming apparatus performs according to the second embodiment of the present disclosure.

FIG. 5 shows steps for activation by the image forming apparatus 10. The activation starts upon a power-up of the image forming apparatus 10. The controller 17 executes a program stored in the main storage section 15 to execute Steps S1-S12 for activation. The flowchart in FIG. 5 is the same as that in FIG. 3 except that Steps S11 and S12 are added to the flowchart in FIG. 3.

Specifically, in the activation in the second embodiment, the image forming apparatus 10 is powered up at Step S1, and the location of the image forming apparatus is detected at Step S2 in the similar manner to those in FIG. 3. Then, the routine proceeds to Step S11.

At Step S11, whether or not the local resource information item in the active state is stored in the ROM 152 is determined (local resource information item in active state stored in ROM?). In Step S11, the resource information retrieval section 172 determines whether or not the activated local resource information item corresponding to the region that includes the location of the image forming apparatus 10 is stored in the ROM 152 of the main storage section 15.

When the activated local resource information item is stored in the ROM 152 (YES at Step S11), the activation is ended. When it is not stored in the ROM 152 (NO at Step S11), the routine proceeds to Step S3.

Once the routine proceeds to Step S3, Steps S3-S6 are performed sequentially in the similar manner to those in FIG. 3. Specifically, the local resource information item in the inactive state is retrieved at Step S3. Whether or not authorization is required is determined at Step S4. Whether or not the authorization is granted is determined at Step S5. Then, the local resource information item is activated at Step S6. Thereafter, the routine proceeds to Step S12.

At Step S12, the activated local resource information item is stored in the ROM 152 (store activated local resource information item in ROM). In Step S12, the activation section 175 causes the ROM 152 of the main storage section 15 to store the local resource information item activated at Step 6. It is noted that Steps S1-S12 constitute a part of the apparatus setting method.

As has been described so far in the second embodiment, the activation section 175 causes the ROM 152 of the main storage section 15 to store the activated local resource information item. The location detecting section 171 detects the self-location at a power-up. When the local resource information item corresponding to the region that includes the detected self-location is not stored in the ROM 152, the resource information retrieval section 172 retrieves the local resource information item from the auxiliary storage section 16. The self-location in the second embodiment is a location of the image forming apparatus 10.

Accordingly, once the local resource information item corresponding to the region where the image forming apparatus 10 is installed is activated, the activated local resource information item in the ROM 152 of the main storage section 15 can be used for apparatus setting in the second embodiment.

As a result, as long as the installation region of the image forming apparatus 10 is not changed, it is unnecessary to retrieve the local resource information item from the auxiliary storage section 16 at each power-up in the second embodiment. Thus, the processing can be facilitated. Besides, the same advantages as in the first embodiment can be obtained in the second embodiment.

What is claimed is:

1. An electronic device comprising:
   a resource information storage section that stores local resource information items in an inactive state to be used for apparatus setting in individual regions;
   a location detecting section that detects a self-location of the electronic device;
   a resource information retrieval section that retrieves a local resource information item corresponding to a region of the individual regions that includes the detected self-location from the resource information storage section; and
   an activation section that reads out the retrieved local resource information item from the resource information storage section and activate the read local resource information item to an active state, wherein
   the activation section loads the local resource information item into a main storage section to change a state of the local resource information item from the inactive state to the active state.

2. An electronic device according to claim 1, wherein
   the activation section causes storage of the activated local resource information item into a nonvolatile area in the main storage section, the location detecting section detects the self-location at a power-up, and when the local resource information item corresponding to the region that includes the detected self-location is not stored in the nonvolatile area, the resource information retrieval section retrieves the local resource information item from the resource information storage section.

3. An electronic device according to claim 1, further comprising:
an authorization information receiving section that receives input of authorization information to be used for authorization in activating the local resource information item; and
an authorization information managing section that causes a storage section to store the authorization information that the authorization information receiving section receives for management.

4. An electronic device according to claim 3, wherein
the activation section sends to an authorization server an authorization request for use of the local resource information item based on the authorization information that the authorization information managing section manages, and activates the local resource information item when the authorization is granted.

5. An electronic device according to claim 1, wherein
the location detecting section detects the self-location using a global positioning system.

6. An electronic device according to claim 1, wherein
the location detecting section detects the self-location using an indoor positioning system that detects a location indoors.

7. An electronic device according to claim 1, further comprising:
an image processing section that forms an image on paper based on a print job.

8. A computer-readable non-transitory storage medium having stored thereon a program that causes a computer included in an electronic device to perform:
causing a resource information storage section to store local resource information items in an inactive state to be used for apparatus setting in individual regions;
detecting a self-location of the electronic device;
retrieving a local resource information item corresponding to a region of the individual regions that includes the detected self-location from the resource information storage section; and
reading out the retrieved local resource information item from the resource information storage section and activating the read local resource information item to an active state, wherein
the activating the read local resource information item includes loading the local resource information item into a main storage section to change a state of the local resource information item from the inactive state to the active state.

9. An apparatus setting method comprising:
causing a resource information storage section to store local resource information items in an inactive state to be used for apparatus setting in individual regions;
detecting, via a location detecting section, a self-location of an electronic device;
retrieving, via a resource information retrieval section, a local resource information item corresponding to a region of the individual regions that includes the detected self-location from the resource information storage section; and reading, via an activation section, out the retrieved local resource information item from the resource information storage section and activating the read local resource information item to an active state, wherein
the activating the read local resource information item includes loading the local resource information item into a main storage section to change a state of the local resource information item from the inactive state to the active state.

10. An electronic device comprising:
a resource information storage section that stores local resource information items in an inactive state to be used for apparatus setting in individual regions;
a location detecting section that detects a self-location of the electronic device;
a resource information retrieval section that retrieves a local resource information item corresponding to a region of the individual regions that includes the detected self-location from the resource information storage section; and
an activation section that reads out the retrieved local resource information item from the resource information storage section and activate the read local resource information item to an active state, wherein
the activation section causes storage of the activated local resource information item into a nonvolatile area in a main storage section,
the location detecting section detects the self-location at a power-up, and
when the local resource information item corresponding to the region that includes the detected self-location is not stored in the nonvolatile area, the resource information retrieval section retrieves the local resource information item from the resource information storage section.

11. An electronic device according to claim 10, further comprising:
an authorization information receiving section that receives input of authorization information to be used for authorization in activating the local resource information item; and
an authorization information managing section that causes a storage section to store the authorization information that the authorization information receiving section receives for management.

12. An electronic device according to claim 11, wherein
the activation section sends to an authorization server an authorization request for use of the local resource information item based on the authorization information that the authorization information managing section manages, and activates the local resource information item when the authorization is granted.

13. An electronic device comprising:
a resource information storage section that stores local resource information items in an inactive state to be used for apparatus setting in individual regions;
a location detecting section that detects a self-location of the electronic device;
a resource information retrieval section that retrieves a local resource information item corresponding to a region of the individual regions that includes the detected self-location from the resource information storage section;
an activation section that reads out the retrieved local resource information item from the resource information storage section and activate the read local resource information item to an active state;

an authorization information receiving section that receives input of authorization information to be used for authorization in activating the local resource information item; and an authorization information managing section that causes a storage section to store the authorization information that the authorization information receiving section receives for management, wherein the activation section sends to an authorization server an authorization request for use of the local resource information item based on the authorization information that the authorization information managing section manages, and activates the local resource information item when the authorization is granted.

14. A non-transitory computer readable storage medium according to claim 8, wherein the activating the read local resource information item includes causing storage of the activated local resource information item into a nonvolatile area in the main storage section, the detecting a self-location includes detecting the self-location of the electronic device at a power-up, and the retrieving a local resource information item includes retrieving the local resource information item from the resource information storage section when the local resource information item corresponding to the region that includes the detected self-location is not stored in the nonvolatile area.

15. A non-transitory computer readable storage medium according to claim 8, the program further causes the computer to perform:

receiving input of authorization information to be used for authorization in activating the local resource information item; and causing a storage section to store the received authorization information for management.

16. A non-transitory computer readable storage medium according to claim 15, wherein the activating the read local resource information item includes sending to an authorization server an authorization request for use of the local resource information item based on the managed authorization information, and activating the local resource information item when the authorization is granted.

17. An apparatus setting method according to claim 9, wherein the activating the read local resource information item includes causing storage of the activated local resource information item into a nonvolatile area in the main storage section, the detecting a self-location includes detecting the self-location of the electronic device at a power-up, and the retrieving a local resource information includes retrieving the local resource information item from the resource information storage section when the local resource information item corresponding to the region that includes the detected self-location is not stored in the nonvolatile area.

18. An apparatus setting method according to claim 9, further comprising:

receiving input of authorization information to be used for authorization in activating the local resource information item; and causing a storage section to store the received authorization information for management.

19. An apparatus setting method according to claim 18, wherein the activating the read local resource information item includes sending to an authorization server an authorization request for use of the local resource information item based on the managed authorization information, and activating the local resource information item when the authorization is granted.

* * * * *